United States Patent [19]

Alloway

[11] Patent Number: 4,858,881
[45] Date of Patent: Aug. 22, 1989

[54] TIRE REPAIR PLATE

[76] Inventor: James W. Alloway, Rte. 2, Box 15-A, College Grove, Tenn. 37046

[21] Appl. No.: 181,109

[22] Filed: Apr. 13, 1988

[51] Int. Cl.$^4$ .............................................. B29C 67/10
[52] U.S. Cl. .................................. 249/135; 249/103; 249/104; 249/140; 425/15; 425/26; 425/28.1; 428/138; 428/418
[58] Field of Search .................................. 249/102–104, 249/114.1, 115, 134, 135, 140; 425/11, 15, 17, 26, 28.1; 428/76, 138, 418; 427/133, 135

[56] References Cited

U.S. PATENT DOCUMENTS

| | | | |
|---|---|---|---|
| 2,632,722 | 3/1953 | Libberton | 428/140 |
| 2,934,790 | 3/1960 | Schwayder | 264/339 |
| 3,153,915 | 10/1964 | Deith | 249/134 |
| 3,292,894 | 12/1966 | Falkenau | 249/134 |
| 3,607,569 | 9/1971 | Greenwell | 264/274 |
| 4,004,774 | 1/1977 | Houston | 249/134 |

FOREIGN PATENT DOCUMENTS

| | | | |
|---|---|---|---|
| 53-67712 | 6/1978 | Japan | 249/135 |
| 1021093 | 2/1966 | United Kingdom | 249/134 |

*Primary Examiner*—James Housel
*Attorney, Agent, or Firm*—Harrington A. Lackey

[57] ABSTRACT

Repair plates particularly adapted for mending various surfaces of a vehicle tire in which a plate body is formed from an epoxy casting resin material which is stable at curing temperatures of at least 220 deg. F., and has a face surface having the same configuration as the area of the surface of the tire to be mended, and a perforated aluminum plate imbedded in the rear surface of the plate body.

3 Claims, 4 Drawing Sheets

TIRE REPAIR PLATE

BACKGROUND OF THE INVENTION

This invention relates to tire repair plates and a of making the same, and more particularly to a tire repair plate molded from a plastic material.

The current practice of repairing a damaged tire and restoring the surface of the repaired area to its original appearance includes a process of machining a metal plate, usually an aluminum plate. Where the plate is used to repair a side wall upon which lettering appears in the tires, the letters must be machined or etched into the surface of the plate which is to fit against the corresponding surface of the tire wall.

The injury in the tire is repaired or mended by filling it with an uncured plug of rubber. The metal side wall or letter plate is placed over the uncured plug in a position corresponding with the original surface and its lettering. The tire and plate are clamped between a pair of heated jaws or curing plates to which heat is applied to a curing temperature of approximately 270-298 deg. F. After the rubber plug is cured, the jaws are removed and the repair plate is removed so that the repaired area is made to look as much like the original tire surface as possible. Various shapes of plates are used for repairing injuries to the side wall or the bead area of the tire. Currently it is not possible to use this method for repairing the tread area of the tire because of difficulty in making corresponding repair plates. when a tire is injured in its tread area, the tire is usually scrapped.

Other methods of repairing tires involving the restoration of the appearance of the surface of the tire, including tread areas, are disclosed in one or more of the following U.S. patents:

| | | |
|---|---|---|
| 1,338,233 | McCormick | Apr. 27, 1920 |
| 1,349,039 | Bitter | Aug 10, 1920 |
| 1,380,320 | Hufford | May 31, 1921 |
| 2,391,300 | Dettling | Dec 18, 1945 |
| 2,814,830 | Leeth | Dec. 3, 1957 |
| 2,875,470 | Goodman | Mar. 3, 1959 |
| 3,190,338 | Wolfe | June 22, 1965 |

U.S. Pat. No. 2,750,632, issued to Kish, on June 19, 1956 discloses a method of making surface reproduction fixtures, such as a hood model from plastic materials, such as urea and phenol formaldehyde resins.

The following U.S. patents disclose various methods of making reinforced printing plates from plastic material:

| | | |
|---|---|---|
| 2,075,507 | Crowell | Mar. 30, 1937 |
| 2,272,254 | Swan | Feb. 10, 1942 |
| 4,474,720 | Izard | Oct. 2, 1984 |

The Izard patent discloses a method of casting a liquid resin, such as epoxy in a mold for producing a porous matrix for the wet-end texturing of fiber board at the final suction press roll of a Fourdrinier fiber board machine. After the epoxy resin is poured into the mold, a perforated metal plate is submerged in the liquid resin and ultimately removed from the resin to provide a plurality of studs and channels in the final matrix for conducting water from the processed slurry through a perforated press roll.

The Applicant has himself attempted to make a tire repair letter plate, that is a repair plate to fit over the lettering on the side wall of a tire, by molding various materials, including epoxies, in a mold to accommodate the surface shape of the side wall of the tire. However, these plates were not satisfactory because they would not transfer the curing heat to the repair area of the tire fast enough. At the suggestion of REN plastics company, the producers of the casting resin which Applicant attempted to mold tire repair plates, Applicant attempted to improve the thermal conductivity of the epoxy plates by the introduction of aluminum filings mixed with the epoxy. Experimental tire repair plates made with the mixture of epoxy and aluminum filings also did not transfer the heat to the repair area with sufficient speed. The Applicant also experimented with a mixture of aluminum chips and epoxy, but the resultant tire repair plates were no more successful than were the plates including a mixture of epoxy and aluminum filings.

The Applicant introduced other materials into the epoxy in order to improve the heat transfer characteristics of the finished repair plate. In one experiment, the Applicant impressed a steel wire screen, that is, chicken wire, into the liquid epoxy to improve the heat conductivity, but the finished plate would not transfer the heat fast enough to cure the raw rubber repair material in a tire. Applicant then used aluminum rods wrapped in spaced parallel relationship with aluminum wires in the epoxy material. However, the resulting repair plates were not satisfactory from a heat transfer standpoint. He tried other types of aluminum arrangements without success.

Applicant then impressed a perforated steel plate as a backing material in the liquid epoxy permitting it to float through the holes in the plate. After the plate was completed, he conducted temperature tests, which resulted in an improved heat transfer capability. Then he used an aluminum perforated plate as a backing material immersed in the resin, since aluminum has a higher heat conductivity than does steel. The heat transfer capabilities of the completed epoxy late with the perforated aluminum plate improved. He also experimented with different brands of casting epoxies and bound that they produced about similar results.

By cutting open one of the epoxy plates which had failed he heat transfer tests, he discovered that there were air voids in the epoxy plate. By experimenting with different and longer curing periods, he discovered that the heat conductivity of the finished repair plate was improved.

Applicant has also experimented with other materials for molding a tire repair plate, such as Babbit metal, Plaster of Paris, and concrete, and found that all of these failed. Not only must the finished plate be capable of a minimum heat conductivity, but must also have dimensional stability and minimum tensile and compressive strengths. He found that Babbit metal distorts excessively, since it has an expansion of approximately 0.015-0.050 inches per inch, whereas casting epoxy resins have an expansion factor of only 0.003-0.004 inches per inch. Moreover, the heated epoxy resins will not expand more than 0.005 inches per inch. Furthermore, it was difficult to extract the Babbit metal from the mold because of an inadequate release agent.

Many plastic materials could not be used because they would not Withstand the curing temperatures of rubber, in the order of 270-298 deg. F.

Applicant also found that Babbit metal had inadequate tensile strength, as does Plaster of Paris and concrete. In the repair of tires, the heated jaws or clamps which are used to squeeze the tire repair area are subjected to 45-55 psi pressure for the repair of passenger vehicle tires, and 95-100 psi for the repair of truck tires.

Applicant has also successfully used perforated copper backing plates within the casting epoxy resin for producing successful tire repair plates, but has found that the copper is too expensive.

SUMMARY OF THE INVENTION

It is therefore an object of this invention to provide an improved tire repair plate and the method of making the same, which is capable of repairing not only the side walls and bead areas of tires, but any portion of a tire which has been injured, including the tread areas and the bladder areas.

The tire repair plates made in accordance with this invention, are molded from an epoxy casting resin incorporating a perforated backing plate of high thermal conductivity which is gradually cured over sustained periods of time and at gradually increasing temperatures in order to produce a tire repair plate for any surface of a tire with commercially acceptable heat transfer rates.

A further object of this invention to provide a heat transfer plate which can be produced in a minimum of time and can accurately reproduce the surface area of the repaired area of the tire with a higher degree of fidelity and at less repair plates. The process of making tire repair plates made in accordance with this invention can be completed in approximately three working days in contrast to seven to ten working days for the production of a solid metal conventional tire repair plate.

Although the tire repair plate made in accordance with his invention requires a curing time for the repaired area of only approximately two minutes longer than for the conventional solid metal curing plate, nevertheless, the heat transfer characteristics of this tire repair plate are commercially acceptable, particularly in view of the substantial improvement in production costs, time, and accuracy of the reproduction of the repaired area.

The tire repair plate made in accordance with this invention is produced by the introduction of the liquid epoxy casting resin into a mold formed and sealed over a pattern of the tire surface to be repaired, the immersion of the perforated backing plate into the resin, the subsequent curing of the molded matrix over sequential periods of time at increasing temperatures, and the subsequent cooling of the matrix to form the tire repair plate. The epoxy casting resin could be any of various types capable of sustaining the high curing temperatures of raw rubber and resulting in a dimensionally and structurally stable molded tire repair plate.

The tire repair plate made in accordance with this invention may be produced for any surface area of the tire, including the outer side wall, the outer bead area, the inner or bladder bead area, or the tread of the tire, so that no injured tire need be scrapped, regardless of the location of the injury.

DESCRIPTION OF THE PREFERRED EMBODIMENTS

Figure 4:
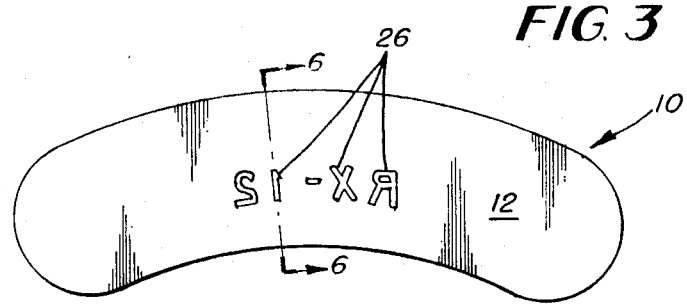
FIG. 4 is a top or face plan view of the completed repair plate for the lettered side wall area of a tire.
Figure 5:
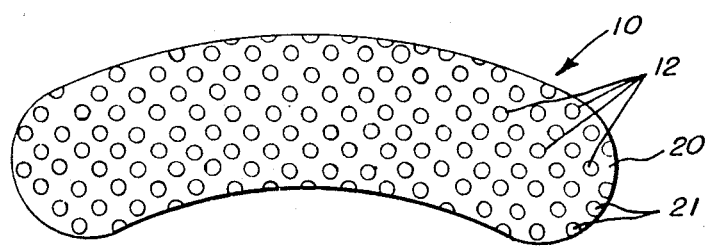
FIG. 5 is a rear or back plan view of the tire repair plate disclosed in FIG. 4.
Figure 6:
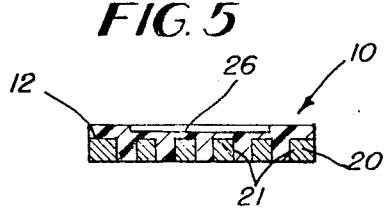
FIG. 6 is an enlarged section taken along the line 6—6 of FIG. 4.
Figure 19:
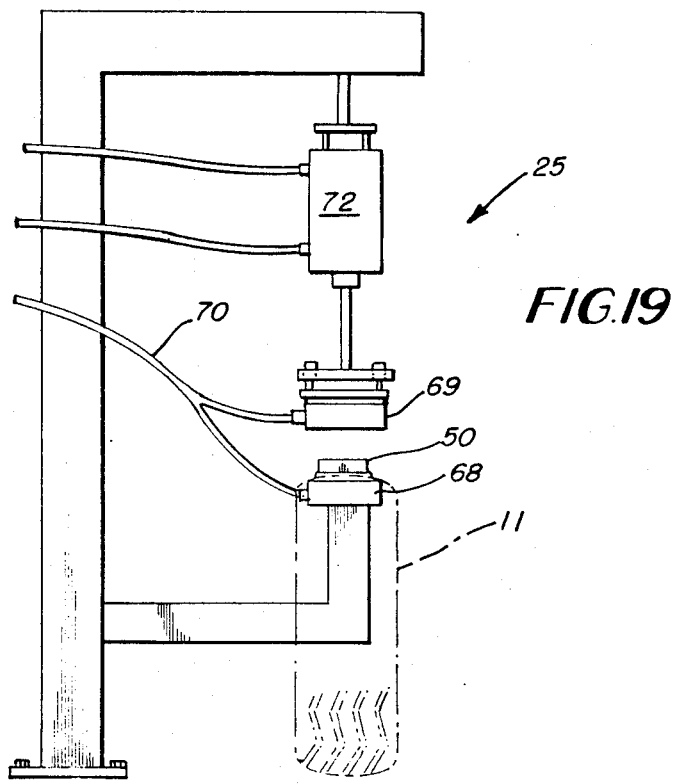
FIG. 19 is a schematic end elevation of a tire repair machine, including a tire and a tread area repair plate made in accordance with this invention, in position, preparatory to curing the repaired tire area.

In a first embodiment of this invention, a side wall letter repair plate 10, as disclosed in FIGS. 4 and 5, is produced for repairing the side wall of a motor vehicle tire, such as the tire 11 disclosed in FIG. 19. This side wall letter plate 10 is molded from an epoxy casting resin 12 and is provided with recessed letters 26 (FIG. 4) capable of reproducing the projecting letters on the side wall of the area of a tire to be repaired.

Figure 1:
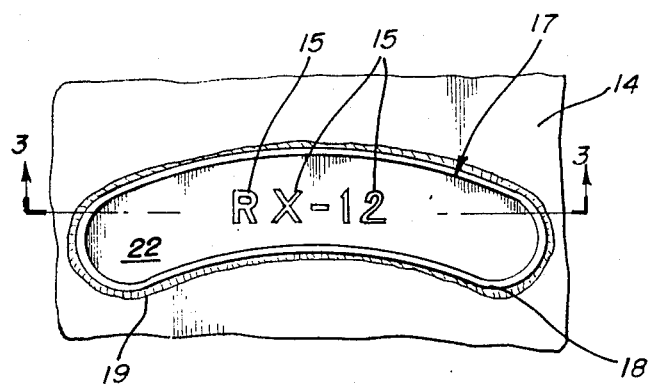
FIG. 1 is a top plan view of a mold mounted upon a tire pattern, shown fragmentarily, preparatory to producing a tire repair plate for the lettered side wall area of a tire.

In the process of making a side wall letter repair plate 10, a pattern 14 having the exact configuration of the surface area of the side wall to be repaired is selected. the preferred method of selecting a pattern is to cut out the same section of the undamaged area of a scrap tire as the corresponding section side wall area of a damaged tire to be repaired. The side wall pattern 14 is for repairing the lettered area of the side wall of a damaged tire and includes the raised letters 15 (FIG. 1).

The area of the scrap tire used as the pattern 14 is cut out large enough to include at least a 1" border around the letters 15.

A mold 17 having a configuration identical to the final shape of the plate 10, is seated upon the pattern 14. The mold 17 may be made of elongated, thin, bendable metal of uniform height, for example 1" high, to form a circumferential wall 18 shaped to correspond with the configuration of the final plate 10. The mold 17 should be of lesser dimensions and occupy a smaller area than the total area of the pattern 14, but have at least a ⅛" border round all of the letters 15. The bottom edges of the mold walls 18 are sealed to the face surface of the pattern 14 by caulking material 19, such as a silicone caulking.

Figure 2:
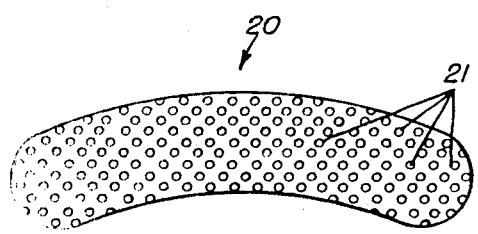
FIG. 2 is a plan view of a perforated base or backing plate of high thermal conductivity utilized in the mold of FIG. 2 for the lettered side wall tire repair plate made in accordance with this invention.

The next step is to cut from a larger perforated metal sheet, or to otherwise form, a perforated metal base or backing plate 20 of a size such that when the plate 20 is inserted into the mold 17, the edges of the plate 20 will be spaced from the corresponding side walls 18 approximately ⅛". In one form of the invention, the perforations 21 are formed in the base plate 20, as best disclosed in FIG. 2, approximately ⅛" in diameter on ⅛" centers. The metal base plate 20 is approximately ⅛" thick. The metal in the perforated plate 20 is of a highly thermal conductive material, such as aluminum or copper.

The perforated base plate 20 is preferably treated with a degreaser material, or sandblasted, in order to improve the bonding characteristics of the surface of the base plate 20 with the epoxy 12.

The interior of the mold 17, including the mold side walls 18 and the mold bottom wall or surface 22, which is that portion of the surface of the pattern 14 confined within the mold walls 18, is sprayed with a conventional release agent for the release of epoxy casting resin after it has set.

A commercial casting epoxy material which comes in two parts, namely the resin and the hardener, is mixed in accordance with the manufacturer's recommendations to form a liquid epoxy mixture. An additional approximate 1% hardener is preferably introduced into the mixture. After the mixture is completed, it is applied with a small paint brush to the interior walls of the mold 17. It is important that the letters 15 are pre-coated with the epoxy 12 to minimize and prevent the formation of air bubbles in the completed letter plate 10.

Additional epoxy mixture is then poured into the mold 17 until it is approximately ⅛" above the highest point on the pattern surface, namely ⅛" above the top surface of the raised letters 15.

Figure 3:
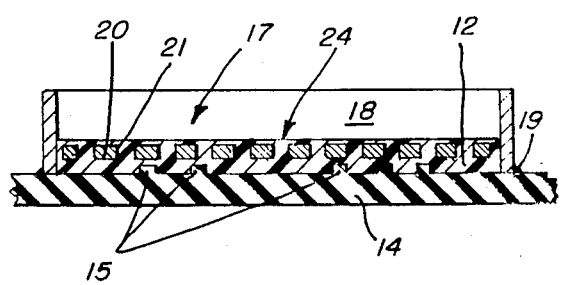
FIG. 3 is an enlarged fragmentary section taken along the line 3—3 of FIG. 1 after the epoxy resin and perforated plate have been introduced into the mold.

The perforated base plate 20 is then inserted into the mold 17 so that it is substantially parallel to the bottom mold surface 22, and is immersed into the liquid resin 20 until its upper surface is barely covered by some of the epoxy liquid mixture 12. When the plate 20 is immersed in the liquid epoxy mixture, the liquid mixture 12 will seep through all of the holes or perforations 21, as best illustrated in FIG. 3. Care must be taken not to press the perforated base plate too far into the liquid epoxy, so that the top or rear surface of the perforated plate is barely covered and becomes substantially copolanar with the rear surface of the completed letter plate 10.

At this point in the process, the liquid resin 12 may be allowed to set for approximately thirty minutes. Then the top surface of the liquid is brushed to remove any air bubbles that may have risen to the surface. Then, the matrix 24, including the liquid epoxy resin 12 and the immersed perforated plate 20, are permitted to set for approximately twelve to sixteen hours. At the end of this time, the mold side walls 18 and the matrix 24 are removed from the pattern 14. This may be accomplished by bending the pattern 14, particularly if it is in the form of a piece of scrap tire material, or a tool, such as a screwdriver, may be inserted along the caulked bottom edges of the mold walls 18 to pry the mold side walls 18 and the matrix 24 away from the pattern 14. Because of the pre-applied release agent, not shown, the matrix 24 may be readily removed from the side walls 18 of the mold 17.

Preferably, the top surface of the matrix 24 is sanded until the thin cover of epoxy is removed, to expose the top metallic surface of the perforated baseplate 20. The longitudinal edges of the matrix 24 on the opposite side from the base plate 20 may also be buffed to provide rounded edges and corners.

The ground and buffed matrix 24 is then cured by inserting the matrix 24 into a closed oven and sequentially heating the matrix 24 according to the following chart:

| PERIOD | TIME | DEGREE FAHRENHEIT |
|--------|------|-------------------|
| 1st | 2 Hours | 128 |
| 2nd | 2 Hours | 210 |
| 3rd | 2 Hours | 265 |
| 4th | 3 Hours | 328 |
| 5th | 12 Hours | Cooling in Oven |

After the matrix 24 has cooled for twelve hours, it becomes the side wall letter plate 10, and after it has been marked for identification is ready for use in a tire repair apparatus 25, such as that disclosed in FIG. 19.

Figure 7:
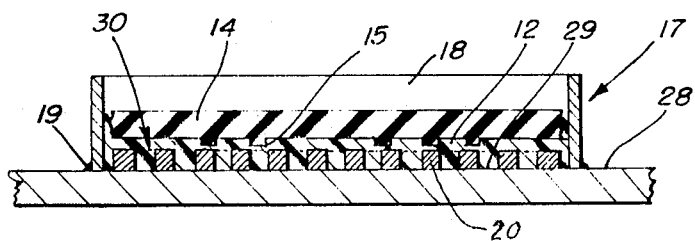
FIG. 7 is an enlarged fragmentary section similar to FIG. 3 of a side wall letter plate made in accordance with a modified process of making the plate disclosed in FIGS. 4 and 5.

FIG. 7 discloses a slightly different method of preparing the side wall letter plate 10 illustrated in FIGS. 4 and 5, by reversing some of the steps.

The mold 17 with its mold walls 18 is placed upon a fixed flat table surface 28, and secured in place by the caulking 19. The same perforated plate 20 is prepared as previously described in connection with FIGS. 1–6. The interior surface of the mold walls 18, the table surface 28 within the mold 17 and the surface of the pattern 14 are treated with a release agent in the same manner as previously described.

The epoxy casting resin 12 is mixed as previously described. The exposed interior surfaces of the mold, including the bottom surface 29, that is the table surface 28 confined within the mold 17, the interior surface of the mold walls 18 and the face surface of the pattern 14 are coated with a thin layer of the epoxy material. Both surfaces of the perforated plate 20 are also pre-coated with a thin layer of epoxy resin, to insure that these respective surfaces are completely coated with the resin.

Then, the perforated plate 20 is first inserted into the mold 17 until it rests upon the bottom mold surface. Next, the mixed, but still liquid epoxy resin is poured into the mold 17 upon the perforated plate 20 permitting the liquid resin to penetrate the perforations 21 in the plate 20 until the resin 12 rests upon the bottom mold surface 29. The resin is poured to a height of approximately ⅛" above the highest point, namely the top surface of the perforated plate 20. Then, the pattern 14 with its letters face down, is lowered into the mold 17 causing the raised letters 15 to penetrate the surface of the epoxy resin 12. A weight, not shown, may be placed upon the top of the pattern 14 to maintain the raised letters 15 immersed in the liquid epoxy resin, until the resin 12 has set to form the matrix 30.

The matrix 30 is then allowed to set for approximately 12 to 16 hours, as in the previous process relating to FIGS. 1-6, and the steps in completing the side wall letter plate 10 are the same as the remaining steps in the treatment of the matrix 24. Thus, the plate produced from the matrix 30 will be identical to the plate 10 disclosed in FIGS. 4 and 5.

FIGS. 8-11 illustrate the apparatus used for producing a tire bead repair plate 32 (FIGS. 10 and 11) in accordance with this invention.

In this process, the tire pattern 33 for the bead area 34, preferably in the form of a whole or sectional piece of the bead area of a scrap tire, is turned to an optimum position for receiving the bead mold 35 and the liquid resin 36.

Figure 8:
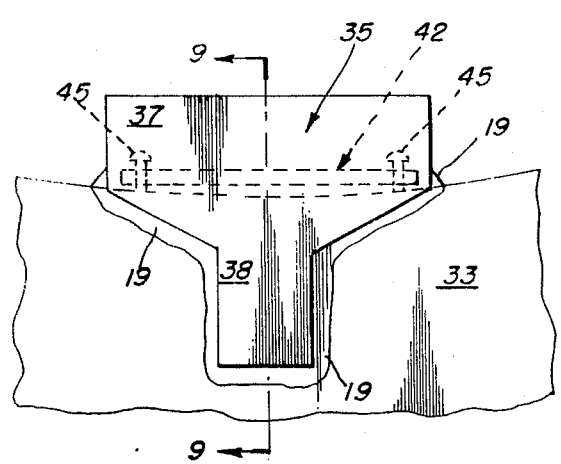
FIG. 8 is an inside elevation taken along the line 8—8 of FIG. 9 of a modified mold mounted upon the exterior bead area of a tire, including a perforated base plate, for making a tire repair plate for the exterior bead area of the tire.
Figure 9:
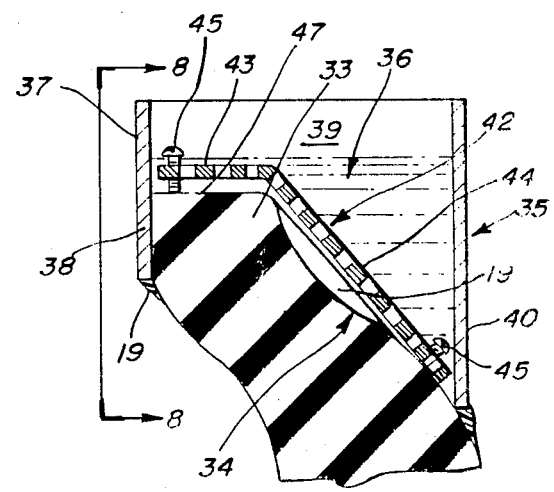
FIG. 9 is a fragmentary section along the line 9—9 of FIG. 8, showing the liquid casting resin.

The mold 35 may be rectangular, as shown, or any other desired shape having an inner wall 37 with a depending tongue 38 for overlapping the inner or bladder side of the bead area, as illustrated in FIGS. 8 and 9. Projecting outward from opposite edges of the front wall 37 are a pair of side mold walls 39, the bottom edges of which conform generally to the shape of the bead area with the top edges substantially level. The rear ends of the side walls 39 join the outer mold wall 40 which is deep enough to abut against the outer surface of the bead area 34, as illustrated in FIG. 9. Any gaps between the bottom edges of the mold walls 37, 39, and 40 are filled with caulking 19. Moreover, the edges of the depending tongue 38 are secured to the inner surface of the bead wall also by caulking 19, as illustrated in FIG. 8. Furthermore, the entire lower edge of the mold walls 37, 39, and 40 are sealed to the corresponding surface of the pattern by caulking 19, whether or not any gaps exist between the bottom edges of the mold walls and the tire surface.

A perforated metal plate 42 is shaped to fit in the bottom portion of the mold 35, adjacent the surface of the bead area 34, with approximately a ⅛" spacing between the margins of the perforated plate 42 and the interior surfaces of the walls of the mold 35. As illustrated in FIG. 9, the perforated plate 42 is provided with an upper horizontal portion 43 and a longer declining portion 44. These portions 42 and 43 are formed by bending a flat perforated plate into the shape illustrated in FIG. 9. After the perforated plate 42 is properly shaped, preferably four sheet metal leveling screws 45 are inserted through corresponding corner portions of the plate 42, so that the bottoms of the screws 45 engage the surface of the tire bead area 34 and space the bottom surface of the perforated plate 42 from the pattern surface at a pre-determined distance.

As previously discussed, the completed perforated plate 42, including the leveling screws 45 are preferably sandblasted or soaked in a degreaser to improve the bonding capabilities between the surface of the plate 42 and the epoxy resin. Before the perforated plate 42 is inserted into the mold 35, the interior surfaces of the mold walls are sprayed with a release agent to facilitate release of the metal walls from the resin 36 after it has set.

The liquid casting epoxy resin 36 is mixed as previously described. Then a thin layer of resin 36 is spread over the interior surfaces of the mold walls 37, 39, and 40, the bottom surface of the mold defined by the bead area surface 34 confined within the mold 35, and the perforated plate 42. The epoxy resin 36 in its liquid form is then poured into the mold to a level approximately ⅛" above the highest point, which would be above the substantially level rim surface 47. Then, the angular perforated plate 42 is lowered into the mold 35 and depressed into the liquid resin 36, allowing the liquid to completely cover the plate and to barely cover the top of the upper level section 43 of the plate 42.

The liquid resin is then allowed to set for approximately 30 minutes, and then the top surface of the resin is lightly brushed to remove any air bubbles that may have risen the surface. The surface should be brushed repeatedly to agitate the top area of the liquid and to force the air bubbles to the surface for removal from the mold.

Figure 10:
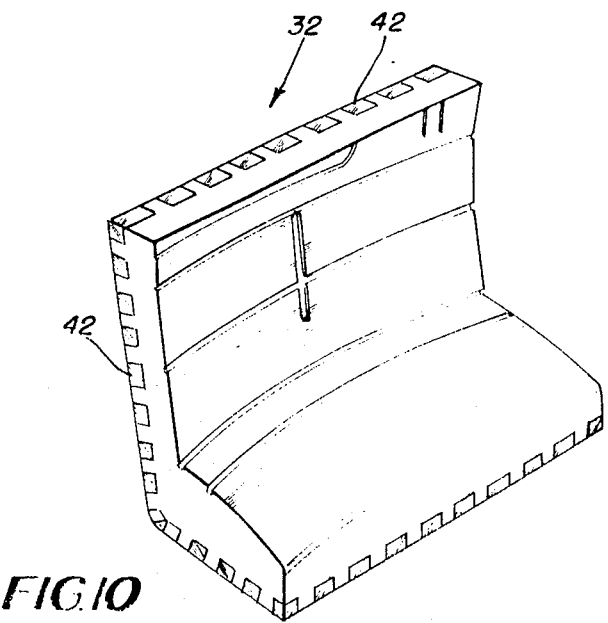
FIG. 10 is an inverted perspective view of the tire repair plate for the exterior bead area produced in the mold disclosed in FIGS. 8 and 9.
Figure 11:
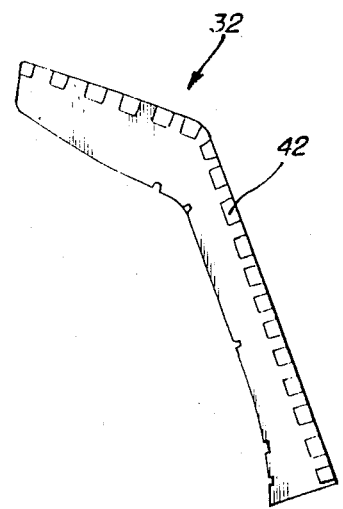
FIG. 11 is an upside down end view of the tire repair plate disclosed in FIG. 10.

The casting resin 36 is then permitted to set for an additional twelve to sixteen hours after the air bubbles have been removed. At this time, the mold 35, including the set matrix, is removed from the tire pattern 33. The mold 35 is then removed from the matrix, now in the shape of the bead plate 32. The upper surface of the perforated plate 42 is then sanded to remove all of the excess resin 36 until the back surface of the perforated plate 42 is barely exposed, as illustrated in FIG. 11. The side edges are also sanded to expose the metal edges of the perforated plate 42, as illustrated in FIGS. 10 and 11. Preferably, a 1/16" radius is formed on all edges of the plate to permit them to be readily used within the tire repair apparatus 19 without damage or chipping.

In order for the plate 32 to fit certain tire repair machines 25, a portion of the horizontal portion 43 of the late may have to be trimmed off at the edge, approximately ⅛".

The matrix 32 is then cured in accordance with the curing schedule previously described in connection with the curing of the plate 10. The plate 32, as illustrated in FIGS. 10 and 11, is then ready for use in the repair of the outer bead area of an injured tire 11, in the repair apparatus 25 (FIG. 19).

In the process of grinding the set matrix, any exposed portions of the screws 45 will be sheared off flush with the corresponding surface of the plate 32.

Figure 15:
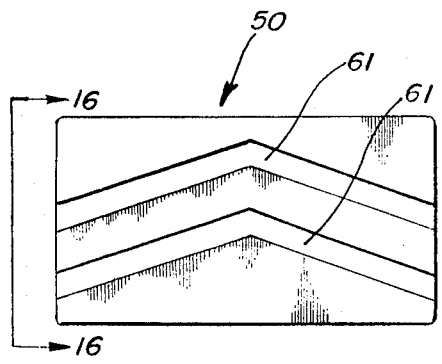
FIG. 15 is a top plan view of the tire repair plate for the tread area of the tire, produced in the mold disclosed in FIGS. 12-14.
Figure 16:
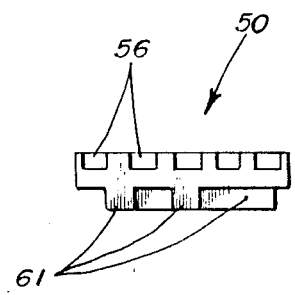
FIG. 16 is an end view taken along the line 16—16 of FIG. 15.

In order to prepare a tread repair plate 50 (FIGS. 15 and 16) a tread pattern is selected, preferably by election of a scrap tire having an uninjured tread area 51. the tread area 51 is positioned as level as possible to form a substantially level bottom tread surface 51 of a mold 53.

Figure 12:
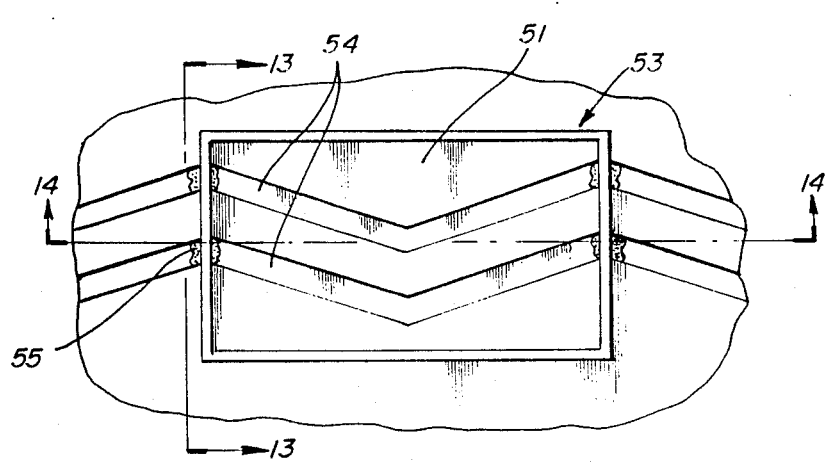
FIG. 12 is a top plan view of another modified mold mounted on a pattern, shown fragmentarily, for the repair of the tread area of a tire.
Figure 13:
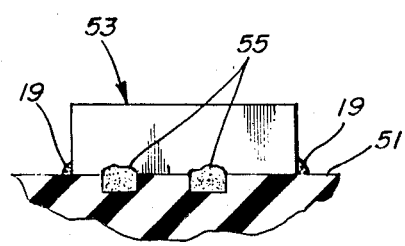
FIG. 13 is a fragmentary section taken along the line 13—13 of FIG. 12.
Figure 14:
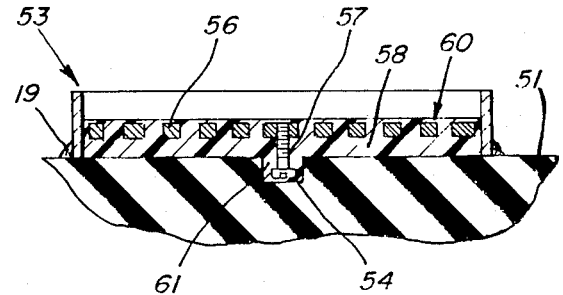
FIG. 14 is a fragmentary section taken along the line 14—14 of FIG. 12, including the molded epoxy resin and the perforated base plate.

If desired, after the tread surface 51 is substantially level, the outline of the mold 53, such as the rectangular mold 53 disclosed in FIGS. 12-14, may be marked with a crayon or chalk, before the mold 53 is placed in position upon the tread area 51. In the places where the marks cross the grooves 54 in the tread surface 51, caulking, such as the silicone caulking 55, may be inserted in the marked portions of the grooves 54 to a height slightly above the surface 51 to form caulking dams. The mold 53 is then positioned upon the tread surface 51 and into the caulking dams 55. The remaining bottom edges of the mold 53 are then caulked with the caulking 19 to the tread surface 51 of the pattern to seal the mold 53 in place.

A perforated base plate 56 is then formed in the same manner as the plate 20 in the repair plate 10. Preferably sheet metal screws 57 are inserted through certain perforations in the base plate 56 which are vertically above the grooves 54 so that the heads of the screws will depend into the grooves 54 for additional strength and reinforcement against cracking or separation of the epoxy from the metal perforated plate 56.

The perforated base plate 56 is then sandblasted or degreased in the same manner as the perforated plate 20, and the entire interior surface of the mold 53, including the tread surface 51, is sprayed with an appropriate release agent for releasing the epoxy resin from the interior surface mold 53, after the matrix has set.

The epoxy resin 58 is then mixed in the same manner in which the epoxy resin 12 is mixed and some of it lightly coated upon the framed area including the interior walls of the mold 53 and the tread surface 51, including the grooves 54. The epoxy resin is then poured into the mold 53 approximately a depth of $\frac{1}{8}''$ above the highest point, such as the tread surface 51.

The perforated base plate 56 is then inserted into the mold 53 and pressed downward into the liquid epoxy resin 58 with the screws 57 registering with and depending into the corresponding grooves 54. The base plate 56 is pressed into the liquid resin 58 just far enough to barely cover the top surface of the base plate 56, as in the previous processes.

After the epoxy resin 58 has set for approximately 30 minutes, the top surface of the liquid resin is lightly brushed to remove any air bubbles as previously described.

The liquid is then permitted to set an additional twelve to sixteen hours after the air bubbles have been removed, as previously described, after which the mold 53 and the matrix 60 are removed and the mold separated from the matrix 60.

The matrix 60 is then treated in the same manner as the matrixes for the other tire repair plates 10 or 32, by anding the back of the plate until the top surface of the metal base plate 56 is exposed. The side edges of the matrix 60 are also ground to remove all excess epoxy down to the metal and the edges and corners trimmed as required for utilization within the repair apparatus 25. In some instances, the tread depth may be trimmed or reduced in order to prevent the projections 61 formed by the pattern grooves 54 from penetrating the grooves of the tread of the tire to be repaired excessively. The sipes areas in the tread plate may have to be trimmed to prevent breakage.

The matrix 60 is then introduced into the oven and cured according to the curing time and temperature schedule previously outlined for the curing of the side wall letter plate 10.

Figure 17:
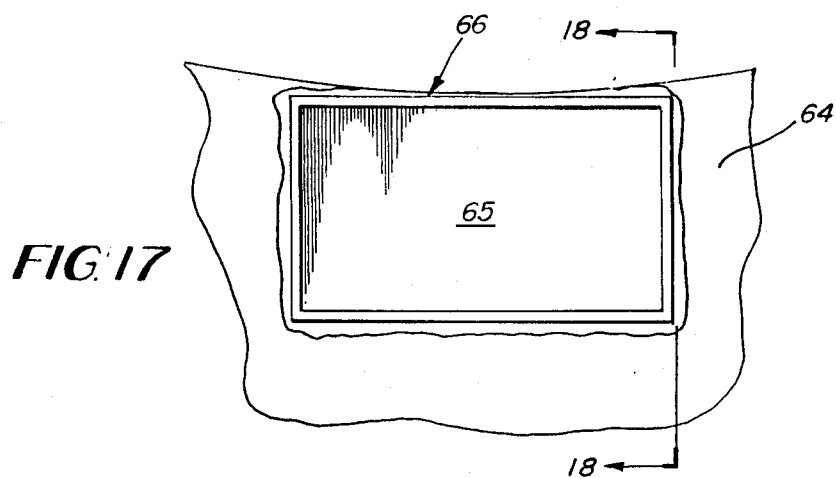
FIG. 17 is a top plan view of another mold mounted upon the interior surface or bladder side of the bead area of a tire, shown fragmentarily.
Figure 18:
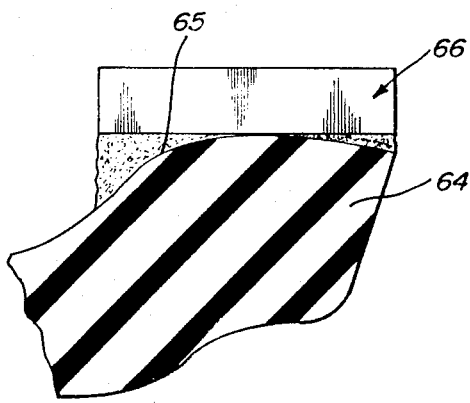
FIG. 18 is an enlarged fragmentary section taken along the line 18—18 of FIG. 17.

FIGS. 17 and 18 illustrate the apparatus used for molding a tire repair plate on the interior surface or bead ladder area of a tire. A scrapped tire is selected having an uninjured corresponding bead bladder area to constitute the pattern 64 of the molding apparatus. A pattern 64 is laid on its side so that the corresponding bead area 65 will be as nearly level as possible, as illustrated in FIG. 18. A mold 66 of appropriate size and shape, such as disclosed in FIGS. 17 and 18, similar to the mold 17 disclosed in FIG. 1, is placed substantially level upon the bead area 65.

The open areas between the bottom edges of the mold 66 and the bead area 65 are filled with the caulking 19. Those edges which lie flush upon the surface 65 are also caulked with the caulking 19 in order to seal the mold 66 in a fixed substantially level position upon the bead area 65, as illustrated in FIGS. 17 and 18. The bead bladder plate is then molded and formed in the same manner as the side wall plate 10, with the same type perforated base plate 20, epoxy resin 12, and with the same preparation, treatment, and curing as the plate 10. In order to avoid repetition, only the pattern 64 and mold 66 have been disclosed in FIGS. 17 and 18.

In FIG. 19, a tire 11 to be repaired, such as in the tread area, is fitted over the lower heated jaw or platen 68 of a conventional tire repair machine 25. The upper platen 69 is also heated such as through the steam lines 70. After the tire is in position upon the lower platen 68, the tread repair plate 50 is placed on top of the tread surface of the tire to be repaired. The hydraulic cylinder 72 is then actuated to drive the upper movable platen 69 downward upon the tire repair plate 50 in order to cure the repaired area in a well known manner.

It will be understood that other areas of the tire, including other inner surfaces or bladder surfaces of the tire may be repaired with corresponding tire repair plates which have been made in accordance with the above processes. Substantially the only difference between the making of the the repair areas will be the selection of other corresponding areas of a scrapped tire to provide a pattern, then leveling that particular area of the pattern and building a corresponding mold to place over the pattern area and sealing the areas between the bottom edges of the mold and the opposing surface of the tire pattern.

The epoxy casting resins, such as the resins 12, 36, and 58 may be any epoxy casting resin which is capable of withstanding the curing temperatures of at least 220–250 deg. F. in the tire repairing machine or apparatus 25 for the duration of the curing and repairing process. Furthermore, this epoxy resin must have sufficient shear strength and tensile strength after it has been hardened or cured to withstand the stresses of the repair process in the apparatus 25. Furthermore, the tire repair plates made in accordance with this invention must be able to withstand the heat and pressure of the repair apparatus 25.

Generally speaking, commercial epoxy casting resins are designed to retain heat and act as insulators, rather than to transfer heat. The epoxy resin tire repair plates made in accordance with this invention must be able to transfer heat. Such transfer of heat through these plates is provided partially by the permanent insertion of the perforated metal base plates having high thermal conductivity, such as aluminum or copper, and also the curing of the epoxy resin in such a manner that it becomes denser and with a minimal volume of air voids. It has been found that the long curing times at the gradually increased temperatures has substantially eliminated air voids, and thereby improves the heat transfer characteristics of the finished plate.

One epoxy casting resin which has been used successfully in the preparation of tire repair plates in accordance with this invention is casting resin RP 4036 R/RP1510 H of REN Plastics of the CIBA-GEIGY Corporation of East Lansing, Mich. The characteristics of this REN Plastics' casting resin which are particularly beneficial to the success of the tire repair plates made in accordance with this invention are the ultimate compressive strength of approximately 34,000 psi (ASTM D 695); the ultimate flexural strength of 10,300 psi (ASTM D 790); and the ultimate tensile strength of approximately 6,000 psi (ASTM D 638-72).

Thus, it is believed that any epoxy casting resin having the same range of properties as the above REN products in producing the thermal transfer characteristics and the strength and pressure characteristics can be successfully used in the above tire repair plates.

The epoxy casting resin should also have a shrinkage factor in the order of approximately 0.0036 inches per inch.

The mixing ratio of the above REN epoxy casting resin product is preferably 100 parts of resin to 8 parts of by weight.

The mixed viscosity of the above REN epoxy casting resin is approximately 27,500 cps (ASTM D 2393-68) and the specific gravity of the REN product is approximately 1.61. The hardness (Shore D) is 90 (ASTM D 2240).

It is therefore believed that a tire repair plate has been designed which may be produced in less time and substantially less expense than the solid metal repair plates now in conventional use. Moreover, the tire repair plate made in accordance with this invention is substantially more versatile in that a plate may be molded for repairing practically any surface area, either interior or exterior, of the tire. Furthermore, a tire repair plate has been made which is far more accurate in the reproduction of the tire surface area to be repaired than the etched metal tire repair plates now in use.

Furthermore, a tire repair plate has been produced which is made of an epoxy casting resin which will permit adequate transfer of heat through the plate to the surface of the tire to be cured within a commercially acceptable time period.

What is claimed is:

1. A repair plate for use in mending a surface of a plastic article, comprising:
    (a) a plate body having a front face surface conforming with the surface of said plastic article to be mended, a rear surface, a circumferential margin, and a substantially uniform thickness,
    (b) said plate body being made of a homogeneous epoxy casting resin material stable under high temperatures of at least 220 deg. F.,
    (c) a metallic base plate of high thermal conductivity having a front surface and a rear surface, a plurality of spaced perforations extending through said base plate from said front surface to said rear surface, and a thickness less than the thickness of said plate body,
    (d) said base plate being embedded in said plate body, said rear surface of said base plate lying substantially coplanar with said rear surface of said plate body, and said front surface of said base plate being spaced from and behind said front face surface of said plate body, and
    (e) said resin material filling said perforations in said base plate.

2. The repair plate according to claim 1 in which said base plate has a perimeter, the perimeter of said base plate being spaced from and within said circumferential margin of said plate body.

3. The repair plate according to claim 1 in which said base plate is made of aluminum.

* * * * *